United States Patent [19]

Fukura et al.

[11] Patent Number: 4,796,164
[45] Date of Patent: Jan. 3, 1989

[54] RETRACTABLE HEADLAMP MOUNTING STRUCTURE

[75] Inventors: Kenichi Fukura, Toyota; Eiji Hiramatsu, Aichi; Akira Nishimura, Toyota, all of Japan

[73] Assignees: Aisin Seiki Kabushiki Kaisha; Toyota Jidosha Kabushiki Kaisha, both of Japan

[21] Appl. No.: 29,813

[22] Filed: Mar. 25, 1987

[30] Foreign Application Priority Data

Mar. 31, 1986 [JP] Japan ................................. 61-73342

[51] Int. Cl.$^4$ ............................................. B60Q 1/06
[52] U.S. Cl. ..................................................... 362/66
[58] Field of Search ........................................ 362/66

[56] References Cited

U.S. PATENT DOCUMENTS 4,630,179 12/1986 Yukimoto .............................. 362/66

FOREIGN PATENT DOCUMENTS 59-128025 7/1984 Japan .
60-35636 2/1985 Japan .

Primary Examiner—Carroll B. Dority, Jr.
Attorney, Agent, or Firm—Finnegan, Henderson, Farabow, Garrett & Dunner

[57] ABSTRACT

A retractable headlamp mounting structure includes a fixed bracket mounted on an automobile frame for supporting a motor, a movable bracket pivotally supported on the fixed bracket for holding a headlamp, and a link having one end connected to the movable bracket and another end connected to the motor, the motor being energizable to cause the movable bracket to be angularly moved through the link between a position at which the headlamp projects out of the automobile hood and a position at which the headlamp is retracted within the hood. The fixed bracket is disposed on the side of a radiator support facing the rear of the automobile to shorten the distance between the radiator support and the front bumper of the automobile.

5 Claims, 3 Drawing Sheets

RETRACTABLE HEADLAMP MOUNTING STRUCTURE

BACKGROUND OF THE INVENTION

1. Field of the Invention

This invention relates to a retractable headlamp mounting structure capable of being utilized in a vehicle, such as a compact sports car, having only a small forward space for accommodating the mounting structure.

2. Description of the Prior Art

FIG. 1 illustrates an example of a conventional retractable headlamp mounting structure of the type described in Japanese patent application Laid-Open (KOKAI) No. 60-35636. The headlamp mounting structure, shown generally as numeral 1, includes a fixed bracket 2 mounted on the body of a vehicle, a movable bracket 3 pivotally mounted on the fixed bracket 2 and having a headlamp (not shown) supported therein, a motor 4 supported on the fixed bracket 2 and a link 5 connecting the motor 4 and movable bracket 3. The fixed bracket 2 is secured to a radiator support 6 on the side thereof directed toward the front of the vehicle, and a point 7 at which the brackets 2,3 are pivotally connected is situated well forward of the radiator support 6.

Since a retractable headlamp mounting structure is advantageous aerodynamically and in terms of design, its use is becoming increasingly widespread not only in large-bodied sporty-type cars but also in compact sports cars. When the fixed bracket 2 of the retractable headlamp mounting structure is secured to the front side of the radiator support 6 in a compact sports car just as is done in the larger cars, as shown in FIG. 1, a distance $l_2$ between the radiator support 6 and a vehicle bumper 8 becomes as great as in the large-bodied car. This makes it difficult or impossible to employ the retractable headlamp mounting structure in a compact sports car which has only a limited amount of space available to accommodate the mounting structure.

SUMMARY OF THE INVENTION

Accordingly, an object of the present invention is to provide a retractable headlamp mounting structure adapted so as to be mountable even in compact sports cars.

In accordance with the present invention, the foregoing object is attained by providing a retractable headlamp mounting assembly for use on an automobile frame, comprising a motor, a fixed bracket mounted on the automobile frame via a radiator support, the fixed bracket supporting the motor and being disposed on a rearward-facing side of the radiator support, a movable bracket pivotally supported on the fixed bracket for holding a headlamp, and a link having one end connected to the movable bracket and another end connected to the motor, the motor being energizable to cause the movable bracket to be angularly moved through the link between a position at which the headlamp projects out of the hood and a position at which the headlamp is retracted within the hood.

In accordance with the invention, the point at which the fixed bracket and movable bracket are pivotally connected is located above the upper end of the radiator support. This allows the movable bracket to be moved without being restricted by the radiator support. Accordingly, the headlamp can be projected from the hood and retracted in the ordinary manner. In addition, the bumper can be brought closer to the radiator support.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
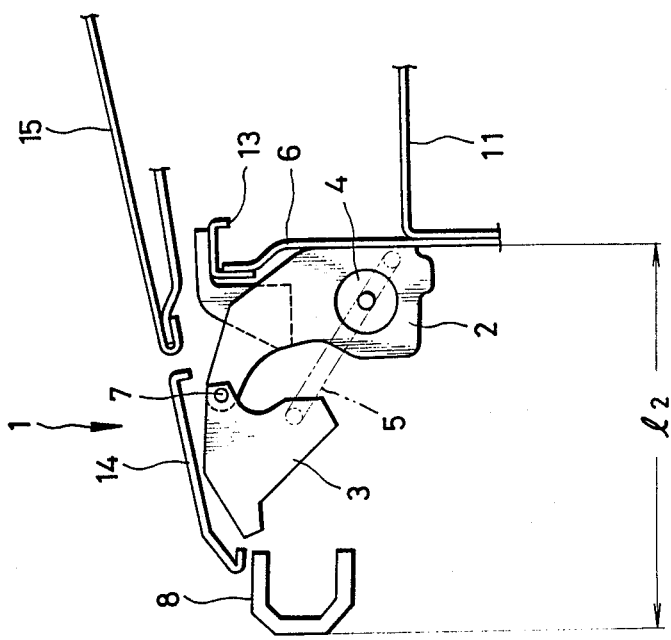
FIG. 1 is a view useful in describing the relationship between a radiator support and a bumber in a retractable headlamp mounting structure according to the prior art.

A preferred embodiment of the present invention will now be described with reference to FIGS. 2 through 4, in which portions similar to those shown in FIG. 1 are designated by like reference characters and need not be described again.

A retractable headlamp assembly 1' in accordance with the invention includes a fixed bracket 2' having a mounting hole 9 opposing the radiator support 6, a mounting hole 10 opposing an apron 11, and a mounting hole 12 opposing an upper radiator support 13 fixed to the radiator support 6. The fixed bracket 2' is fixedly mounted on the vehicle frame by passing screws through the mounting holes 9, 10, 12 and screwing the bracket 2' to the radiator support 6, apron 11 and upper radiator support 13. It will be noted that the fixed bracket 2' is attached to the radiator support 6 on the side thereof facing the rear of the vehicle, namely the side opposite the bumper 8.

Figure 2:
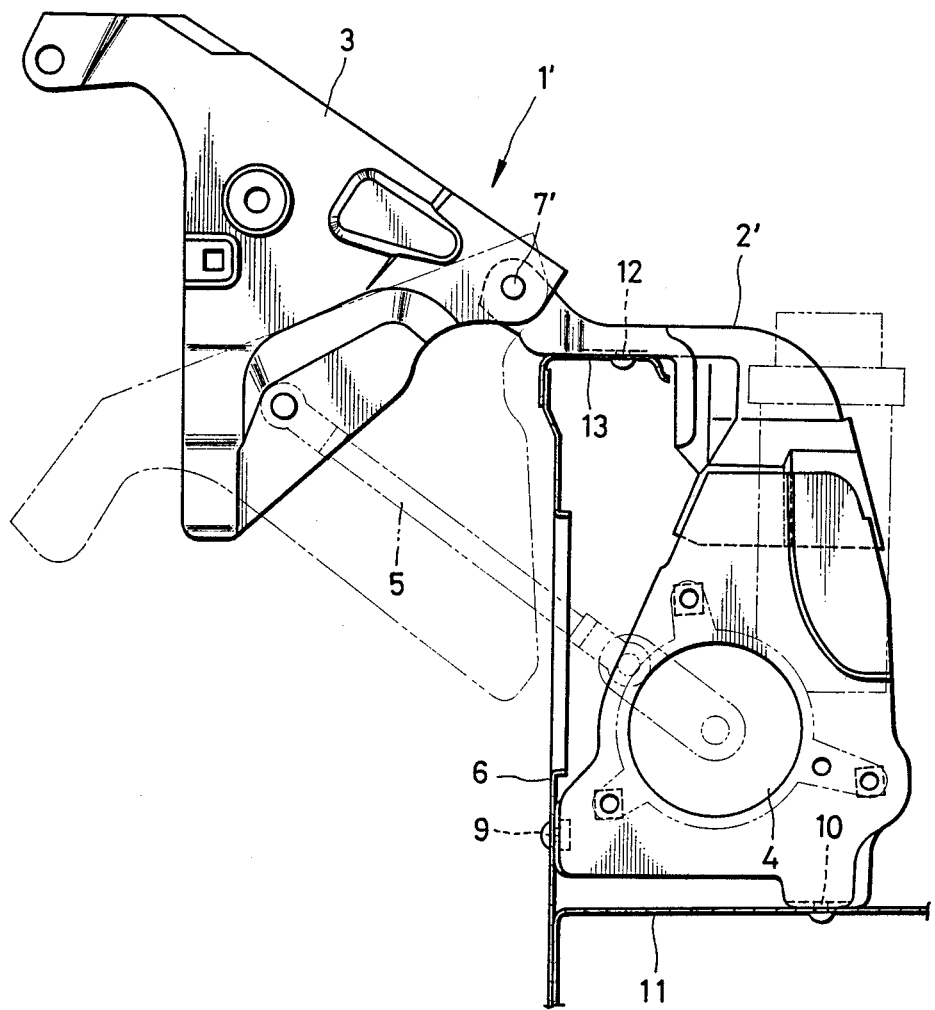
FIG. 2 is a side view illustrating a preferred embodiment of a retractable headlamp mounting structure according to the present invention.

The movable bracket 3 is pivotally supported on the fixed bracket 2' at a pivot point 7', which is situated above the upper radiator support 13, as best shown in FIG. 2. The motor 4 is supported on the fixed bracket 2' and is connected to the movable bracket 3 by the link 5.

Figure 3:
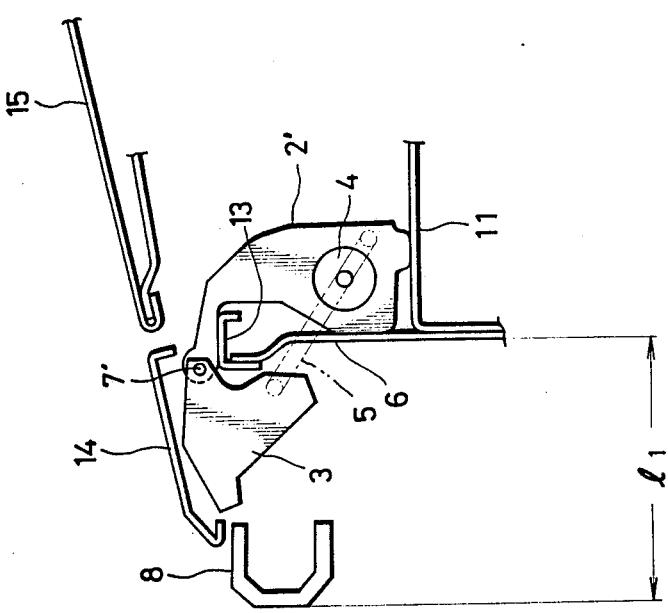
FIG. 3 is a view useful in describing the relationship between a radiator support and a bumber in the retractable headlamp mounting structure of the present invention.
Figure 4:
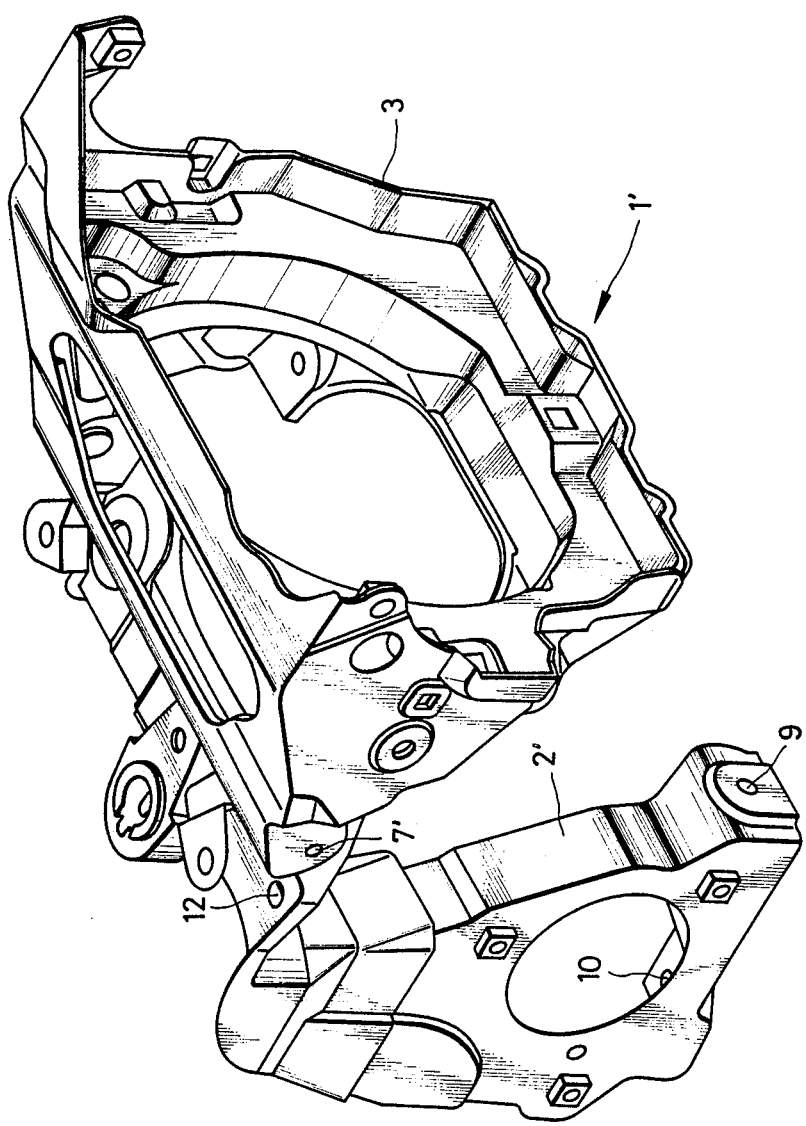
FIG. 4 is a perspective view showing fixed and movable brackets in the retractable headlamp mounting structure of the present invention.

As shown in FIG. 3, placing the fixed bracket 2' on the rearward side of the radiator support 6 enables the bumper 8 to be brought closer to the radiator support 6, thereby reducing the distance between the radiator support 6 and the bumper 8 from $l_2$ (prior art) to $l_1$.

Numeral 14 denotes a headlamp cover, and 15 a hood.

In operation, the motor 4 is energized to cause the movable bracket 3 to be angularly moved about the pivot point 7' through the link 5, whereby the headlamp may be selectively raised to a position protruding from the hood 15 and retracted to a lower position within the hood, in which state the headlamp is concealed by the cover 14. The operation performed by the driver to raise and lower the headlamp is the same as in the prior art and need not be described here.

When mounting the retractable headlamp mounting structure 1', the weight of the fixed bracket 2' is borne by the apron 11, and the weight of the movable bracket 3 is borne by the upper radiator support 13. This facilitates assembly and mounting without the danger of the brackets falling. Since the invention reduces the amount of space on the front side of the radiator support 6, more freedom is available in designing sports cars of compact size.

As many apparently widely different embodiments of the present invention can be made without departing from the spirit and scope thereof, it is to be understood that the invention is not limited to any specific embodiments therefor, and all such embodiments are deemed to come within the scope of the appended claims.

What we claim is:

1. A retractable headlamp mounting structure for use on an automobile frame having a hood, comprising:

a radiator support mounted on the automobile frame, said radiator support having a vertically extending main portion, an upper portion, and a horizontally extending apron;

a fixed bracket disposed behind said main portion of said radiator support with the weight of said fixed bracket being borne by said apron, said fixed bracket having a connecting portion extending across the upper portion of the radiator support and resting thereon;

a motor support by said fixed bracket;

a movable bracket pivotably supported at one end of said fixed bracket connecting portion for holding a headlamp with the weight of said movable bracket being borne by said upper portion of said radiator support; and a link having a first end connected to said movable bracket and a second opposite end connected to said motor;

said motor being energizable to cause said movable bracket to be angularly pivoted through said link between a position where the headlamp projects out of the hood and a position where the headlamp is retracted within the hood.

2. A retractable headlamp mounting structure as defined in claim 1, wherein said connecting portion is secured on said upper portion of said radiator support.

3. A retractable headlamp mounting structure as defined in claim 2 wherein the connection portion has a pivot point, around which the movable bracket is enabled to rotate.

4. A retractable headlamp mounting structure as defined in claim 3 wherein the pivot point is disposed adjacent to the upper portion of the radiator support.

5. A retractable headlamp mounting structure as defined in claim 4, wherein the main portion of the radiator support includes an opening through which the link moves forward and backward.

* * * * *